United States Patent Office 2,985,145
Patented May 23, 1961

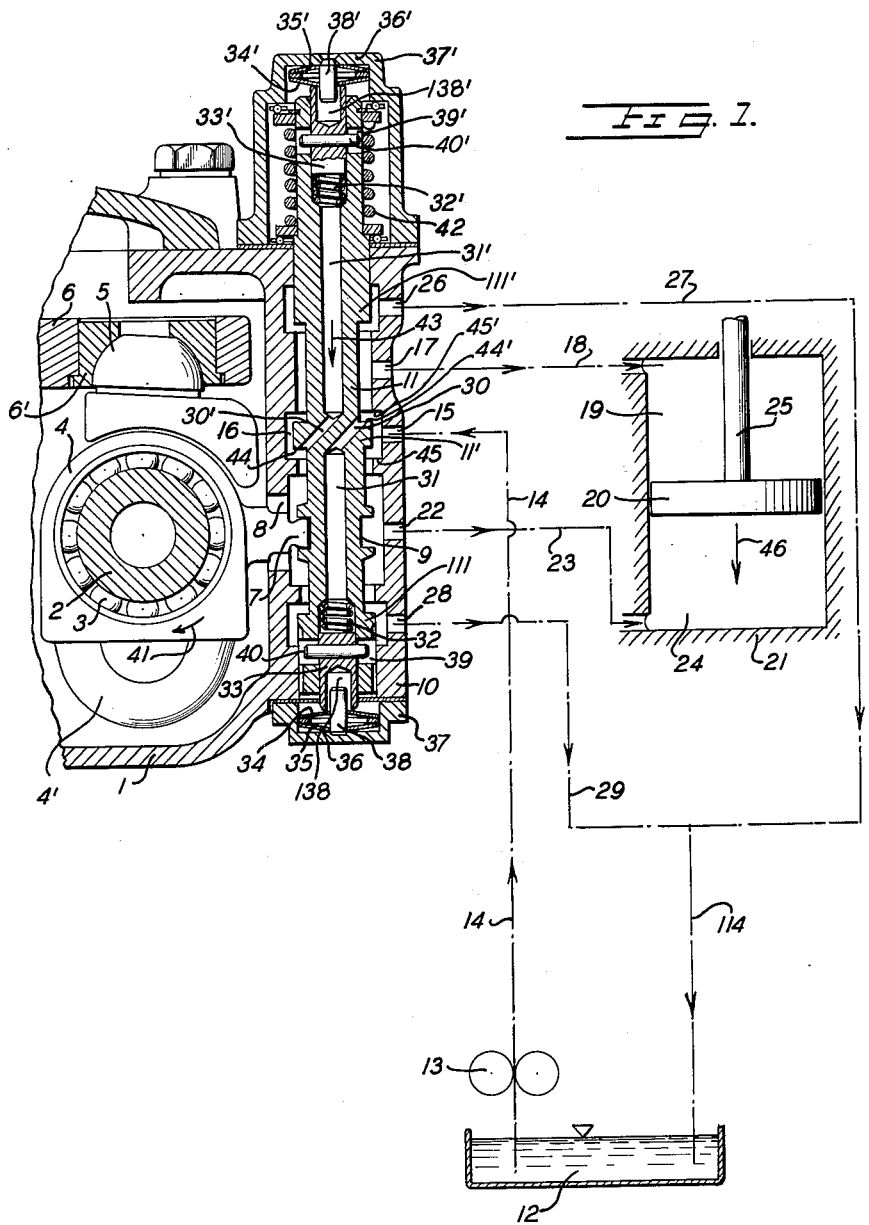

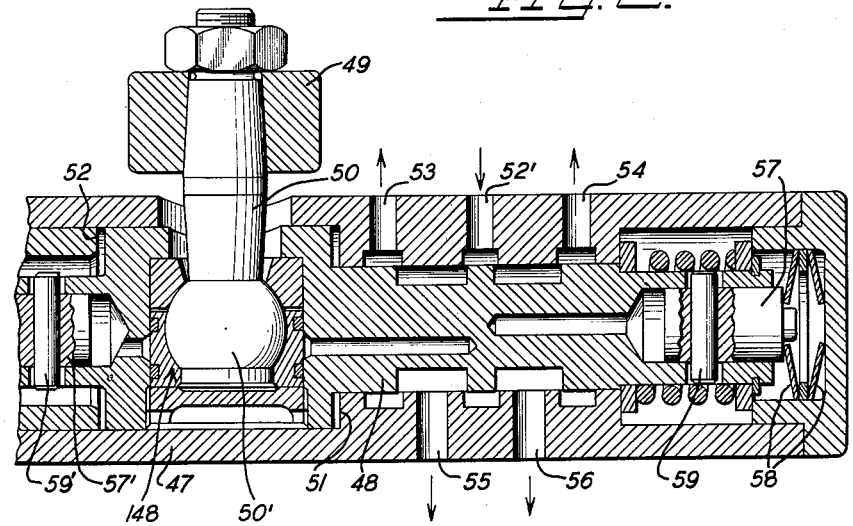
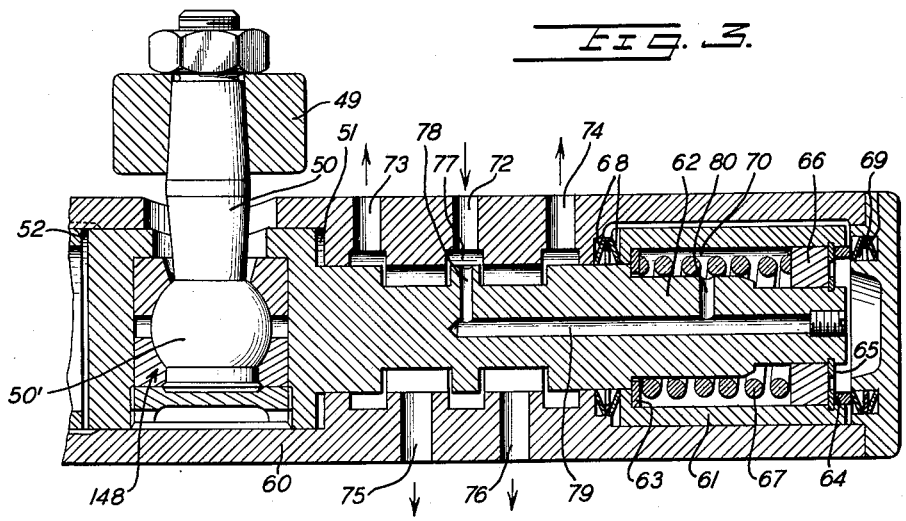

2,985,145
CONTROL DEVICE FOR A SERVO-STEERING MECHANISM OF MOTOR VEHICLES

Hans-Joachim M. Foerster, Stuttgart-Bad Cannstatt, and Josef A. Helmer, Stuttgart-Unterturkheim, Germany, assignors to Daimler-Benz Aktiengesellschaft, Stuttgart-Unterturkheim, Germany Filed Jan. 6, 1958, Ser. No. 707,297

Claims priority, application Germany Jan. 12, 1957

12 Claims. (Cl. 121—46.5)

The present invention relates to a servo-steering mechanism for motor vehicles in which a hydraulically actuated piston in a servomotor which aids in the steering movement is controlled over a control slide valve member in dependence on a control member responsive to small angular displacements at the steering wheel, in which at least one reaction piston which abuts against the housing thereof is arranged at the control slide valve member by means of which the manual force to be applied at the steering wheel is maintained proportional to the steering force at the vehicle wheels, and in which means are provided in order to maintain the proportionality between the manual force and the steering force only within a predetermined range while the manual force to be applied at the steering wheel is maintained constant therebeyond with an increasing steering force.

As contrasted to the known servo-steering mechanisms, in which the proportionality between the manual force and the steering force at the vehicle wheels is maintained by a relatively complex, complicated, and sensitive pressure control member constructed in the manner of a valve only within a predetermined range, beyond which the manual force to be applied to the steering wheel remains constant notwithstanding an increasing steering force, the present invention aims at a more simple and structurally more favorable servo-steering mechanism which is subject to fewer troubles and breakdowns.

The present invention consists in that between the reaction piston or pistons and the reaction surface or surfaces in the housing of the control slide valve member, pre-tensioned spring means as well as further means limiting the relative movement of the reaction pistons with respect to the control slide valve member are provided.

Such a construction permits an arrangement in which the manual force to be applied at the steering wheel remains proportional to the steering force at the steering wheels for such a length of time as the reaction piston moves freely in the control slide valve member and may be considered, as a result of the abutment thereof at the pre-tensioned spring means, as a unit rigidly connected with the housing. However, as soon as the reaction piston overcomes the pre-tension of the spring means, the reaction piston may move relative to the housing until the means limiting the relative movement between the control slide valve member and the reaction piston combines the control slide valve member and the reaction piston into a unit and the reaction force will be determined only by the pre-tension of the spring means, i.e., no longer by the magnitude of the pressure at the reaction piston which balances itself now within the control slide valve member.

The construction in accordance with the present invention permits with simple means an embodiment fulfilling the actual, practical requirements during use of servo-steering mechanisms, which require during drive only a relatively little auxiliary force in order not to lose the road feeling at the steering wheel and which, however, while driving at a lower speed, for example, during parking, make available, as is desirable, the aid of as large as possible an auxiliary force.

According to another feature of the present invention, the pre-tensioned spring means between the one or the several reaction pistons and reaction surfaces in the housing of the control slide valve member may consist of preferably two disk or cup springs which according to still another feature of the present invention advantageously offer a non-linear spring characteristic in that, for example, they are slotted. Furthermore, the means limiting the relative movement between each reaction piston and the control slide valve member may consist in an advantageous manner of a pin transversely extending through the reaction piston, for example, a notched or splined pin, the extending ends of which are arranged in cross bores provided in the control slide valve member and having larger diameters than the pin diameters.

According to still another feature of the present invention, guide pins may be rigidly arranged at the reaction surfaces in the housing of the control slide valve member against which the reaction pistons or the disk or cup springs which cooperate therewith abut, which guide bolts or pins extend through the disk or cup springs into bores of the reaction pistons.

Accordingly, it is an object of the present invention to provide a servo-steering mechanism in which the proportionality between the manual force and the steering force at the wheels is maintained only over a predetermined range, and in which the manual force to be applied at the steering wheel beyond this range is kept constant.

It is another object of the present invention to provide a servo-steering mechanism of the type described hereinabove which is simple in construction, reliable in operation, and which responds to small angular displacements at the steering wheel.

Still another object of the present invention is the provision of an arrangement in which certain parts of the servo-steering mechanism may move relative to each other over predetermined distances and which thereupon move together.

Another object of the present invention resides in the provision of pre-tensioned springs, preferably disk or cup springs provided with slots, which determine the predetermined constant force to be applied against the steering wheel once the range of proportionality is exceeded.

Another object of the present invention lies in the provision of a spring which has a non-linear spring characteristic in combination with a servomechanism which is responsive to small angular displacements at the steering wheel.

Still another object of the present invention resides in the provision of a servo-steering mechanism which is essentially free from failure and breakdown in operation and therewith reduces repairs to a minimum.

These and other objects, features and advantages of the present invention will become more obvious from the following description when taken in connection with the accompanying drawing, which shows, for purposes of illustration only, several embodiments in accordance with the present invention, and wherein:

Figure 1 is a partial cross-sectional view through a servo-steering mechanism in accordance with the present invention, showing certain parts thereof schematically;

Figure 2 is a partial cross-sectional view on an enlarged scale of a different embodiment of a servo-steering mechanism in accordance with the present invention, and Figure 3 is a partial cross-sectional view on an enlarged scale showing still another modified embodiment of a servo-steering mechanism in accordance with the present invention.

Referring now to the drawing, wherein like reference numerals are used throughout the various views to designate like parts, and more particularly to Figure 1, reference numeral 1 designates the steering gear housing in which the steering spindle 2 is rotatably supported in any suitable manner by appropriate bearings (not shown). The steering spindle 2 is connected with the steering shaft and with the steering wheel (not shown) and is provided with helical external grooves, as is well known. The steering spindle 2 is operatively connected with the steering nut member 4 by means of one or several chains of endless anti-friction balls 3 which are in operative engagement with the external helical grooves provided on the spindle 2 and with the internal helical grooves of complementary shape provided in the nut member 4. One or several return ducts 4' of suitable construction are provided to return the anti-friction balls 3 and provide one or several endless chains. The semi-spherically shaped ball member 5 is operatively connected with the nut member 4 and itself is in operative engagement with the insert member 6' providing a socket of complementary hemispherical shape for the ball member 5. The insert 6' itself is suitably secured in an appropriate aperture provided in the lever 6. This type of a steering arrangement provides for a conversion of the rotary movement emanating from the steering spindle 2 into axial movement of the nut member 4 along the steering spindle 2. The axial movement of nut member 4 in turn is transformed by means of the semispherically shaped pin 5 into a rotary movement of the lever 6. Since this type of steering gear spindle and nut member is well known in the art, a more detailed description is dispensed with herein. The arrangement may be of any suitable construction, for example, as disclosed in our copending application Serial No. 664,318, filed June 7, 1957, entitled, "Servo Steering Mechanism for Motor Vehicles," and in the copending application Serial No. 671,926, filed July 15, 1957, entitled, "Servo Steering Mechanism for Motor Vehicles," assigned to the same assignee.

A small lever or ledge member 7 which serves as control member responsive to small angular movements at the steering wheel is rigidly arranged at the steering nut member 4 which control member 7 extends through the aperture 8 in the housing and engages the annular groove 9 of the control slide valve member 11 which is adapted to reciprocate within the control slide valve housing 10. The control slide valve housing 10 may be part of the steering gear housing 1 and may be formed integrally therewith or made of several parts suitably secured to the housing 1.

A supply pump 13 of any suitable construction supplies hydraulic fluid from the sump or reservoir 12 over the line or conduit 14 to the inlet port 15 provided in the control slide valve housing 10. The port 15 is in communication with the space 16 formed in the control slide valve housing 10. Depending on the position of the spool-type control slide valve member 11, the hydraulic medium, such as oil, supplied over line 14 through port 15 into the space 16 may flow off either through port 17 and over line 18 into the space 19 above the piston 20 or through port 22 over line 23 into the space 24 below the piston 20. The piston 20 is arranged to reciprocate within the servo cylinder 21 and subdivides the cylinder space into two separate spaces 19 and 24 alternately supplied with hydraulic medium under pressure, as will be described more fully hereinafter. The piston rod 25 of the piston 20 is connected in any suitable manner with a part of the steering system which influences the steering movement of the vehicle wheels of the motor vehicle so that movement of the piston 20 and therewith of the piston rod 25 in one or the other direction will hydraulically aid the steering movement initiated at the steering wheel, as will also appear more fully from the description of the operation which will follow hereinafter.

As the piston 20 moves in one or the other direction, the oil which is displaced thereby may flow off over line 18 or 23 through port 17 or 22 and through discharge ports 26 or 28 and discharge lines or conduits 27 and 29, respectively, into the discharge line 114 which leads back to the reservoir or sump 12. The position of the control slide valve member 11 determines which of the two lines 18 or 23 is in communication with the discharge lines 27 and 29, respectively.

The spool-type control slide valve member 11 is provided with two axial bores 31 and 31' which are in communication with opposite sides of the central collar portion 11' of the control slide valve member 11 over inclined bores 30 and 30'. The cylinder space 32 disposed at the end of axial channel or bore 31 and the cylinder space 32' disposed at the end of the axial channel or bore 31' accommodate therein reaction piston 33 and 33', respectively, which abut against the springs 34, 35 and 34', 35', respectively, which may be of any suitable construction so as to have a non-linear spring characteristic. Preferably, the springs 34, 35 and 34', 35' are disk or cup springs which in turn abut against the reaction surfaces 36 and 36' formed in the covers 37 and 37' of the control slide valve housing 10 to which they are secured in any suitable manner.

A guide pin or bolt 38 is secured in the cover or lid 37 whereas a guide pin or bolt 38' is suitably secured in the cover 37'. The guide pins 38 and 38' extend axially through the springs 34, 35 and 34', 35' into an aperture 138 of the reaction piston 33 and into an aperture 138' of the reaction piston 33'. A transverse bore 39 in the control slide valve member 11 within the region of a reaction piston 33 accommodates therein a notched or splined pin 40 which extends transversely through the reaction piston 33. A similar splined pin 40' extends transversely through the reaction piston 33' into a transverse bore 39' provided in the control slide valve member 11 within the region of the reaction piston 33'. The diameter of the cross bores 39 and 39' are larger than the diameter of the splined pins 40 and 40'. Both the reaction piston 33 as well as the reaction piston 33' are thus supported by appropriate spring means 34, 35 and 34', 35' against the covers 37 and 37', respectively, of the control slide valve member housing 10 and are retained by appropriate means 39, 40 and 39', 40' limiting a relative movement with respect to the control slide valve member 11 within the same.

*Operation*

With a non-actuated steering mechanism, i.e., with the control slide valve member 11 in its normal rest or initial position, a constant flow of hydraulic medium such as oil supplied from the pump 13 over line 14 and through inlet port 15 takes place through the discharge ports 28 and 26 and discharge lines 27 and 29 through the return duct 114 into the oil reservoir 12. By displacement of the control slide valve member 11 in the one or the other direction upon application of a steering force at the steering wheel, pressure differences will occur as will appear more fully hereinafter between the flow paths 15 and 26 and 15 and 28 which become effective and act on the servo-piston 20 in the cylinder spaces 19 and 24 of the servo-cylinder 21. The pressure differences are also effective, dependent on the position of the control slide valve member 11, either through the inclined bore 30 and the axial bore 31 on the reaction piston 33 arranged at the one end of the control slide valve member 11 in the cylinder space 32 or through the inclined bore 30' and the axial bore 31' on the reaction piston 33' disposed at the other end of the control slide valve member 11 in the cylinder space 32'.

More particularly, in operation, as the steering nut member 4, upon initiation of a steering movement over the steering spindle 2, carries out a reaction movement in the direction of the arrow 41 in addition to the axial movement thereof along the steering spindle 2, the lever or ledge member 7 which has a certain width in the axial direction of the steering spindle 2 so that it may remain in engagement with the control slide valve member 11 during axial movement of the steering nut member 4, forces or pushes the control slide valve member 11 in the direction of arrow 43 against the effect or force of the spring 42 which determines point of engagement, i.e., the initial force necessary to be overcome to release or initiate the auxiliary force.

As soon as the control edge 44 provided at the collar portion 11' of the control slide valve member 11 approaches the control edge 45 provided within the control slide valve member housing 10, a throttling takes place and pressure differences occur which seek to move the piston 20 in the servo-cylinder 21 in the direction of arrow 46. This is due to the fact that the control edge 44 effectively throttles the communication between the inlet port 15 and the outlet port 22 so that all the oil supplied under pressure from pump 13 over conduit 14 which enters the port 15 flows through the port 17 through the line 18 into the cylinder space 19, the collar portion 111' provided at the upper end of the control slide valve member 11 effectively throttling the discharge line 27 which is in communication with the interior of the slide valve member housing 10 through discharge port 26.

The hydraulic medium under pressure present in the cylinder space 24 which is being displaced upon downward movement of the piston 20 in the direction of the arrow 46 may flow off over line 23, port 22 in the slide valve member housing 10, discharge port 28 also provided in the control slide valve member housing 10, discharge line 29 and discharge conduit 114 back to the sump 12. The hydraulic medium present in the space 16 in the control slide valve member housing 10 also reaches, in addition to being conducted into the servo-cylinder 21 and more particularly into the cylinder space 19 thereof through port 17 and over line 18, through the inclined bore 30 into the axial bore 31 and thereby exerts a force on the reaction piston 33. As long as the reaction piston 33 moves freely in the cylinder space 32 of the control slide valve member 11, it may be considered as being rigidly connected into a unit with the control slide valve member housing 10 due to the abutment thereof against the pre-tensioned spring means 34, 35. The reaction force which may be sensed at the steering wheel and which initially is applied to the control slide member 11 is thereby proportional to the prevailing oil pressure in the cylinder space 32. However, if this oil pressure exceeds the pre-tensioning of the spring means 34, 35, then the reaction piston 33 may move toward the cover 37 of the control slide valve housing 10 until the pin 40 abuts against the lower wall of the cross bore 39. From that moment on, the reaction piston 33 and the control slide valve member 11 may be considered as a unit and the reaction force will only be determined henceforth by the pre-tensioning of the cup springs 34, 35, and no longer by the magnitude or value of the oil pressure in the cylinder space 32 acting on the reaction piston 33. The oil pressure now balances or equalizes itself within the control slide valve member 11. As soon as the splined or notched pin 40 abuts against the wall of the cross bore 39, the manual force to be applied at the steering wheel remains constant even with increasing auxiliary force.

During movement of the steering nut member 4 in a direction opposite to the direction 41, the reaction piston 33' is loaded in a similar manner as the reaction piston 33 by the pressure oil and the same operational effects are obtained. Under these circumstances, the control slide valve member 11 is moved a slight distance in the direction opposite to the arrow 43 until the control edge 44' of the collar portion 11' of the control slide valve member 11, again approaches the control edge 45' formed in the control slide valve member housing 10 by the space 16 thereof. As soon as this takes place, a pressure difference will be developed due to the throttling effect of the collar portion 111 provided at the lower end of the control slide valve member 11 which now effectively blocks the discharge port 28 whereby hydraulic medium under pressure will be supplied through inlet port 15, space or chamber 16, port 22, and line 23 to the cylinder space 24 in the servo-cylinder 21. As a result thereof, the servo-piston 20 will now move in a direction opposite to the arrow 46 and will thereby displace the oil present in the cylinder space 19 over conduit 18, port 17, port 26, and discharge lines 27 and 114 back to the reservoir.

The hydraulic medium under pressure which is present in the cylinder space 24 will also become effective through the inclined bore 30' and the axial bore 31' on the reaction piston 33'. Again, as long as the reaction piston 33' is able to move freely within the cylinder space 32' of the control slide valve member 11, it may be considered as being rigidly connected with the control slide valve member housing 10. The reaction force which may be sensed at the steering wheel and which acts on the control slide valve member 11 is, therefore, proportional to the prevailing oil pressure present in the cylinder space 32'. However, if the oil pressure exceeds the pre-tensioning of the cup springs 34' and 35', then the reaction piston 33' may move toward the cover 37' or the control slide valve member housing 10 until the pin 40' abuts against the upper wall of the cross bore 39'. From now on, the reaction piston 33' and the control slide valve member 11 again are to be considered as a unit and the reaction force is only determined by the force exhibited by springs 34' and 35', however, no longer by the value of the oil pressure in the cylinder space 32' on the reaction piston 33'. The oil pressure again equalizes itself within the control slide valve member 11. Thus, as soon as the pin 40' abuts against the upper wall of cross bore 39', the manual force to be applied to the steering wheel remains constant with increasing auxiliary force.

The arrangement of the steering gear including nut member and spindle may be of any suitable construction, for example, as shown and disclosed in our aforementioned co-pending application Serial No. 664,318, or as shown and described in the aforementioned co-pending application Serial No. 671,926, assigned to the assignee of the present application. The pertinent features of each of the two aforementioned co-pending applications are incorporated herein by reference insofar as applicable or necessary.

Figure 2 shows a different embodiment of a control valve 47 in accordance with the present invention provided with a control slide valve member 48, the construction of which corresponds essentially to the control slide valve member 11 of Figure 1. The control valve 47 is arranged in the steering linkage of the motor vehicle, for example, in the tie-rod. The lever 49 which is actuated by the steering gear (not shown) of any suitable construction, for example, of the type shown in Figure 1 or of any other suitable conventional construction, engages with the bolt member 50 which is provided with a ball member portion 50' which in turn is suitably secured within a socket member generally designated by reference numeral 148, which may be made of any suitable number of parts, for example, of three parts, as shown in Figure 2. Upon occurrence of a steering movement, the lever 49 actuates the bolt member 50 and therewith the control slide valve member 48 by the engagement of the ball portion 50' in the socket 148 itself rigidly secured within the control slide valve member 48, until the control slide valve member 48 abuts against the abutment surface 51 or 52 formed within the control valve housing 47. As a result of such abutment, as in the case of the embodiment according to Figure 1, the inlet port 52 through which the hydraulic medium under pressure supplied by the pump, such as the oil pump 13, as well as the discharge ports 53 and 54 connected with the return ducts leading to the sump or reservoir 12 and the ports 55 and 56 leading to the servo cylinder 21 are controlled by the movement of the control slide valve member 48. For that purpose, the control slide valve member 48 is provided with appropriate collar portions which valve the various ports 52', 53, 54, 55 and 56 in order to obtain the same control effects as are obtained with the control slide valve member 11 of Figure 1.

At both ends of the control slide valve member 48, reaction pistons 57 and 57' are provided which abut against the housing of the control valve 47 by means of springs of appropriate construction, preferably by means of slotted cup springs 58. Cross pins 59 and 59' extend through appropriate bores in the control slide valve member 48 and limit the relative movement between the control slide valve member 48 and the reaction piston 57 or 57'. As to the remainder, the operation of the device shown in Figure 2 corresponds to the operation of the embodiment described in detail hereinabove with reference to Figure 1.

The control valve 60 of the embodiment according to Figure 3 is also arranged, similarly to the control valve 47 of Figure 2, in the steering linkage, for example, in the tie rod of a motor vehicle. The function of this control valve 60 corresponds to those of the embodiment shown and described in connection with Figures 1 and 2. However, the construction of the embodiment of Figure 3 is different from those of Figures 1 and 2 by the provision of only a single reaction piston 61 at only one end of the control slide valve member 62. The reaction piston 61 is maintained in its normal or rest position by the abutment rings 63, 64, 65 and 66 and the spring 67 which determines the point of engagement of the auxiliary force, i.e., the force necessary at the steering wheel to initiate the aid of the auxiliary force. The reaction piston 61 abuts or supports itself against the housing 60 of the control valve by means of the cup springs 68 and 69.

In the operation, during a steering movement and therewith a movement of the control slide valve member 62 in one or the other direction, a counterforce is exerted on the reaction piston 61 either by the cup spring 68 or by the cup spring 69 which continues for such length of time until the oil pressure in the cylinder space 70 exceeds the pre-tensioning of the one or other cup spring 68 and 69 whereupon the reaction force is only determined by the pre-tensioning of the cup spring 68 or 69, however, no longer by the magnitude of the oil pressure in the cylinder space 70. Reference numeral 72 designates the inlet port to which the hydraulic medium under pressure is supplied from the pump 13 whereas reference numerals 73 and 74 designate discharge ports which lead back to the sump 12 over discharge lines 27 and 29 and discharge conduit 114, as shown in Figure 1. The ports through which oil is supplied to one or the other cylinder spaces 19 and 24 of the servo-cylinder 21 are designated by reference numerals 75 and 76.

*Operation*

In the operation, when a steering movement is initiated at the steering wheel, such steering movement is translated by displacement of the control slide valve member 62 of the embodiment of Figure 3 in one or the other direction. The pressure prevailing in space 77 into which the oil under pressure is supplied through the port 72 will also prevail in the cylinder space 70 by the provision of a radial bore 78 terminating radially outwardly in the collar portion which is disposed in the space 77, a radial bore 80 which is disposed in the control slide valve member 62 and terminates radially outwardly in the cylinder space 70, and an axial bore 79 which connects the radial bores 78 and 80 radially inwardly thereof.

As soon as a sufficient manual force is applied to the steering wheel to overcome the spring tension of spring 67 disposed within the cylinder space 70, so as to displace the control slide valve member 62 in the one or the other direction, the reaction piston 61 is taken along, thereby bringing the reaction piston 61 into abutment against one or the other cup springs 68 or 69 which will then exert a counterforce on the reaction piston 61. As a result thereof, the reaction force on the slide valve member 62 remains proportional to oil pressure until the latter exceeds the value of the pre-tensioning of the spring 68 or 69.

Thus, the embodiment of Figure 3, though it only includes a single reaction piston, operates in principle essentially in the same manner as the embodiments of Figures 1 and 2.

While we have shown and described several embodiments in accordance with the present invention, it is understood that the same is not limited thereto but is susceptible of many changes and modifications within the spirit of the present invention, and we intend to cover all such changes and modifications as encompassed by the appended claims.

We claim:

1. A servo-steering mechanism for motor vehicles compring servo-means including a hydraulically actuated piston for aiding in the manual steering movement, control valve means responsive to small angular movements at the steering wheel for controlling the hydraulic medium to said servo-means, said control valve means including a relatively stationary housing part and a control slide valve member movable within said relatively stationary housing part in response to a manual force applied to said steering wheel to turn the steerable vehicle wheels, and means operative for maintaining the proportionality between the force to be applied at the steering wheel and the steering manual force to be exerted at the vehicle wheels by said servo-means within only a predetermined range of said steering force while keeping constant said manual force upon exceeding said predetermined steering force range including reaction piston means cooperating with said valve member, pre-tensioned spring means in operative engagement with said reaction piston means, and means for limiting the relative movement between said reaction piston means and said control slide valve member, said reaction piston means including at least one reaction piston cooperating with said slide valve member for opposing its movement in accordance with the control of the hydraulic medium to said servo-means in said steering force range.

2. A servo-stering mechanism according to claim 1, wherein said pre-tensioned spring means are disposed between said reacton piston means and said housing part.

3. A servo-steering mechanism according to claim 2, wherein said pre-tensioned spring means consist of two cup springs each.

4. A servo-steering mechanism for motor vehicles according to claim 3, wherein said cup springs are slotted to provide non-linear spring characteristics.

5. A servo-steering mechanism according to claim 1, wherein said reaction piston means includes at least one said reaction piston disposed at one end of said control valve means and slidably arranged within said control slide valve member, and wherein said means for limiting the relative movement includes a pin extending through said piston, and wherein said control slide valve member is provided with a transverse bore of larger diameter than said pin into which the projecting ends of said pin extend.

6. A servo-steering mechanism according to claim 5, wherein one said reaction piston with a transversely extending pin is arranged at each end of said control slide valve member.

7. A servo-steering mechanism according to claim 5, wherein only one said reaction piston is provided which is operative in both directions of reciprocatory movement of said control slide valve member.

8. A servo-steering mechanism according to claim 1, wherein said housing part is provided with reaction surface means against which abut said spring means, and further comprising guide means extending into said reaction piston means for guiding the same.

9. A servo-steering mechanism according to claim 8, wherein said spring means are disk springs provided with a central aperture, said guide means extending through said central apertures.

10. A servo-steering mechanism for motor vehicles comprising servo-means including a hydraulically actuated piston for aiding in the mnaual steering movement, control valve means responsive to small angular movements at the steering wheel for controlling the hydraulic medium to said servo-means, and means operative for maintaining proportionality between the manual force to be applied at the steering wheel and the steering force to be exerted at the vehicle wheels by said servo-means within only a predetermined range of said steering force while keeping constant said manual force upon exceeding said predetermined steering force range including reaction piston means cooperating with said control valve means, and pre-tensioned spring means in operative engagement with said reaction piston means for controlling the operation of said reaction piston means in said range.

11. A servo-steering mechanism for motor vehicles comprising servo-means including a hydraulically actuated piston for aiding in the manual steering movement, control valve means responsive to small angular movements at the steering wheel for controlling the hydraulic medium to said servo-means, said control valve means including a relatively stationary housing part and a control valve slide member movable within said relatively stationary housing part in response to a manual force applied to said steering wheel to turn the steerable vehicle wheels, and means operative for maintaining proportionality between the manual force to be applied at the steering wheel and the steering force to be exerted at the vehicle wheels by said servo-means within only a predetermined range while keeping constant said manual force upon exceeding said predetermined steering force including spring-loaded reaction piston means cooperating with and movable with respect to said control valve member, and means operative for limiting the relative movement between said reaction piston means and said control valve slide member.

12. A servo-steering mechanism for motor vehicles comprising servo-means including a hydraulically actuated piston for aiding in the manual steering movement, control valve means responsive to small angular movements at the steering wheel for controlling the hydraulic medium to said servo-means, said control valve means including a relatively stationary housing part and a control valve slide member movable within said relatively stationary housing part in response to a manual force applied to said steering wheel, and means operative for maintaining proportionality between the manual force to be applied at the steering wheel and the steering force to be exerted by said servo-means at the vehicle wheels within only a predetermined range of said steering force while keeping constant said manual force upon exceeding said predetermined steering force range, said last-mentioned operative means including pressure responsive means responsive to the control of hydraulic medium to said servo-means within said range for opposing displacement of said control valve slide member with respect to said stationary housing part and variable-force means cooperating with said pressure responsive means to control the forces acting upon said valve slide member when said range is exceeded.

References Cited in the file of this patent

UNITED STATES PATENTS

| | | |
|---|---|---|
| 2,590,137 | Towler et al. | Mar. 25, 1952 |
| 2,796,851 | Ziskal | June 25, 1957 |
| 2,808,120 | Hunter | Oct. 1, 1957 |
| 2,824,550 | Gribler et al. | Feb. 25, 1958 |
| 2,924,202 | Mazur et al. | Feb. 9, 1960 |

UNITED STATES PATENT OFFICE
CERTIFICATE OF CORRECTION

Patent No. 2,985,145                          May 23, 1961

Hans-Joachim M. Foerster et al.

It is hereby certified that error appears in the above numbered patent requiring correction and that the said Letters Patent should read as corrected below.

Column 8, line 22, for "compring" read -- comprising --; line 47, for "servo-stering" read -- servo-steering --; line 49, for "reacton" read -- reaction --; column 9, line 10, for "mnaual" read -- manual --.

Signed and sealed this 24th day of April 1962.

(SEAL)
Attest:

ESTON G. JOHNSON
Attesting Officer

DAVID L. LADD
Commissioner of Patents